(12) United States Patent
Shin et al.

(10) Patent No.: US 10,319,526 B2
(45) Date of Patent: Jun. 11, 2019

(54) THIN-FILM CAPACITOR

(71) Applicant: SAMSUNG ELECTRO-MECHANICS CO., LTD., Suwon-si, Gyeonggi-do (KR)

(72) Inventors: Hyun Ho Shin, Suwon-si (KR); Yun Sung Kang, Suwon-si (KR); Seung Mo Lim, Suwon-si (KR); Kyo Yeol Lee, Suwon-si (KR); Dong Joon Oh, Suwon-si (KR); Woong Do Jung, Suwon-si (KR); Ho Phil Jung, Suwon-si (KR); Hai Joon Lee, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 4 days.

(21) Appl. No.: 15/645,339

(22) Filed: Jul. 10, 2017

(65) Prior Publication Data

US 2018/0144872 A1 May 24, 2018

(30) Foreign Application Priority Data

Nov. 24, 2016 (KR) .................. 10-2016-0157456

(51) Int. Cl.
*H01G 4/30* (2006.01)
*H01G 4/33* (2006.01)
(Continued)

(52) U.S. Cl.
CPC ............... *H01G 4/33* (2013.01); *H01G 4/228* (2013.01); *H01G 4/236* (2013.01); *H01G 4/306* (2013.01)

(58) Field of Classification Search
CPC ........... H01G 4/33; H01G 4/228; H01G 4/306
See application file for complete search history.

(56) References Cited

U.S. PATENT DOCUMENTS

| 5,745,335 A * | 4/1998 | Watt ...................... H01G 4/232 257/E21.011 |
| 8,008,161 B2 * | 8/2011 | Bachmann .......... H01L 27/0805 257/E21.004 |

(Continued)

FOREIGN PATENT DOCUMENTS

| JP | 2006-332147 A | 12/2006 |
| JP | 2011-077157 A | 4/2011 |

(Continued)

*Primary Examiner* — Nathan Milakovich
(74) *Attorney, Agent, or Firm* — Morgan Lewis & Bockius LLP

(57) ABSTRACT

A thin-film capacitor includes a body having a plurality of dielectric layers and first and second electrode layers alternately stacked on a substrate, first and second electrode pads disposed on one surface of the body, a plurality of vias having a multistage shape being disposed in the body, a first via of the plurality of vias connects the first electrode layer to the first electrode pad, and penetrates from the surface of the body to a first lowermost electrode layer adjacent the substrate, a second via of the plurality of vias connects the second electrode layer to the second electrode pad, and penetrates from the surface of the body to a second lowermost electrode layer adjacent the substrate and an upper surface of the first electrode layer is exposed in the first via, and an upper surface of the second electrode layer is exposed in the second via.

8 Claims, 14 Drawing Sheets

(51) Int. Cl.
*H01G 4/228* (2006.01)
*H01G 4/236* (2006.01)

(56) References Cited

U.S. PATENT DOCUMENTS

| | | | | |
|---|---|---|---|---|
| 8,343,361 B2* | 1/2013 | Takeshima | ............ | H01G 4/228 |
| | | | | 216/13 |
| 8,564,181 B2* | 10/2013 | Choi | ............ | H01L 41/0474 |
| | | | | 310/340 |
| 9,030,800 B2* | 5/2015 | Namikawa | ............ | H01G 4/306 |
| | | | | 361/301.4 |
| 9,929,231 B2* | 3/2018 | Lee | ............ | H01L 27/016 |
| 10,062,516 B2* | 8/2018 | Kang | ............ | H01G 4/005 |
| 2010/0246092 A1* | 9/2010 | Shibue | ............ | H01G 4/232 |
| | | | | 361/313 |
| 2011/0074535 A1 | 3/2011 | Banno | | |
| 2012/0105188 A1 | 5/2012 | Lim et al. | | |
| 2013/0043509 A1* | 2/2013 | Cho | ............ | H01L 27/11526 |
| | | | | 257/208 |
| 2013/0258545 A1* | 10/2013 | Yano | ............ | H01G 4/306 |
| | | | | 361/301.4 |
| 2017/0278637 A1* | 9/2017 | Park | ............ | H01G 4/33 |
| 2017/0338039 A1* | 11/2017 | Lim | ............ | H01G 4/012 |
| 2017/0338042 A1* | 11/2017 | Shin | ............ | H01G 4/33 |
| 2018/0033560 A1* | 2/2018 | Shin | ............ | H01G 4/33 |
| 2018/0040422 A1* | 2/2018 | Shin | ............ | H01G 4/008 |
| 2018/0061573 A1* | 3/2018 | Shin | ............ | H01G 4/33 |
| 2018/0061581 A1* | 3/2018 | Lee | ............ | H01G 4/012 |
| 2018/0068798 A1* | 3/2018 | Lee | ............ | H01G 4/012 |
| 2018/0144866 A1* | 5/2018 | Han | ............ | H01G 4/232 |
| 2018/0342352 A1* | 11/2018 | Park | ............ | H01G 4/06 |

FOREIGN PATENT DOCUMENTS

| | | |
|---|---|---|
| JP | 2013-098554 A | 5/2013 |
| JP | 2013-191863 A | 9/2013 |
| KR | 10-1158220 B1 | 6/2012 |
| KR | 10-1210374 B1 | 12/2012 |

* cited by examiner

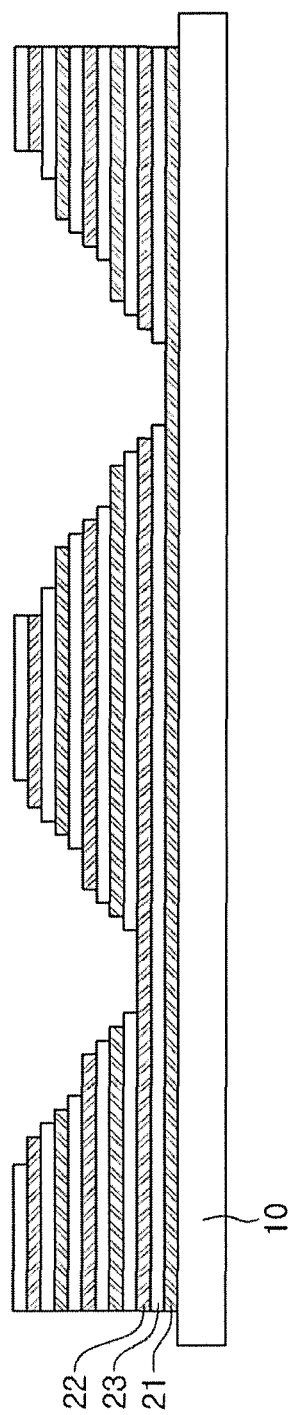

THIN-FILM CAPACITOR

CROSS-REFERENCE TO RELATED APPLICATION

This application claims the benefit of priority to Korean Patent Application No. 10-2016-0157456, filed on Nov. 24, 2016 with the Korean Intellectual Property Office, the entirety of which is incorporated herein by reference.

TECHNICAL FIELD

The present disclosure relates to a thin-film capacitor.

BACKGROUND

In recent years, portable information technology (IT) products such as smartphones, wearable devices, or the like, have been made thinner. Accordingly, there is a necessity for thinness in passive elements to allow an overall package thickness to be decreased.

To this end, demand for a thin-film capacitor having a thickness less than that of a multilayer ceramic capacitor has also increased.

For capacitors manufactured by a thin film method, a method of forming a via connecting an external electrode to an electrode layer and connecting electrode layers is important. The method for forming the via and the final structure of the via may affect the performance of the thin-film capacitor.

In a method of fabricating a thin-film capacitor according to the related art, when a via is formed after repeatedly stacking a dielectric layer and an electrode layer, one via is required for one electrode layer. Thus, there is provided a method of forming a via as the number of electrode layers.

Next, as a method of patterning electrode layers when the electrode layers are stacked, in a case in which even-numbered electrode layers and odd-numbered electrode layers having different forms are stacked, and one side of the laminate is etched, only the even-numbered or odd-numbered electrode layers are exposed to connect electrodes.

However, since the above-mentioned methods complicate operations and increase manufacturing costs, a technology for easily fabricating a further miniaturized thin-film capacitor is required.

Meanwhile, when a plurality of dielectric layers are stacked using a thin film technique, it is important to stably connect a plurality of electrode layers disposed above and below each of the dielectric layers to improve product reliability.

In particular, there is a need for a structure that can prevent damage to an electrical connection portion and delamination between thin films caused by external stress when and after a thin-film capacitor is mounted to a substrate.

SUMMARY

An aspect of the present disclosure may provide a highly reliable, compact thin-film capacitor having high capacitance.

According to an aspect of the present disclosure, a thin-film capacitor may include: a body having a plurality of dielectric layers and first and second electrode layers alternately stacked on a substrate; and first and second electrode pads disposed on one surface of the body. A plurality of vias having a multistage shape may be disposed in the body.

A first via of the plurality of vias may connect the first electrode layer to the first electrode pad, and may penetrate from the surface of the body to a first lowermost electrode layer adjacent the substrate. A second via of the plurality of vias may connect the second electrode layer to the second electrode pad, and may penetrate from the surface of the body to a second lowermost electrode layer adjacent the substrate. An upper surface of the first electrode layer may be exposed in the first via, and an upper surface of the second electrode layer may be exposed in the second via. When a radius of each of the first and second vias disposed in the first and second lowermost electrode layers is $R_0$, in the first and second vias disposed in the first and second electrode layers having the same polarities as the first and second lowermost electrode layers from a portion of the first and second electrode layers, disposed above the first and second lowermost electrode layers, to first and second uppermost electrode layers adjacent the surface of the body, a radius of each of the first and second vias to an upper surface of the portion of the first and second electrode layers, through which the portion of the first and second electrode layers having the same polarities is exposed, is $R_1$ ($i \geq 1$), a radius of the exposed upper surface of the portion of the first and second electrode layers having the same polarities as the first and second lowermost electrode layers from the portion of the first and second electrode layers, disposed above the first and second lowermost electrode layers, to the first and second uppermost electrode layers adjacent the surface of the body, is $dR_i$ ($i \geq 1$), and an exposed area of each of the first and second lowermost electrode layers is $\pi R_0^2$, an area of the exposed upper surface of the portion of the first and second electrode layers, disposed above the first and second lowermost electrode layers and having the same polarities as the first and second lowermost electrode layers, is defined as $2\pi(R_i+dR_i/2)dR_i$, the area of the exposed upper surface falling within $\pi R_0^2 < 2\pi(R_i+dR_i/2)dR_i < 2\pi(R_{i+1}+dR_{i+1}/2)dR_{i+1}$ ($i \geq 1$) and being increased upwardly from each of the first and second lowermost electrode layers.

BRIEF DESCRIPTION OF THE DRAWINGS

The above and other aspects, features, and advantages of the present disclosure will be more clearly understood from the following detailed description, taken in conjunction with the accompanying drawings, in which:

FIGS. 7A through 7D are views illustrating a process of forming an insulating layer in a via within a thin-film capacitor according to exemplary embodiments of the present disclosure.

DETAILED DESCRIPTION

Figure 1:
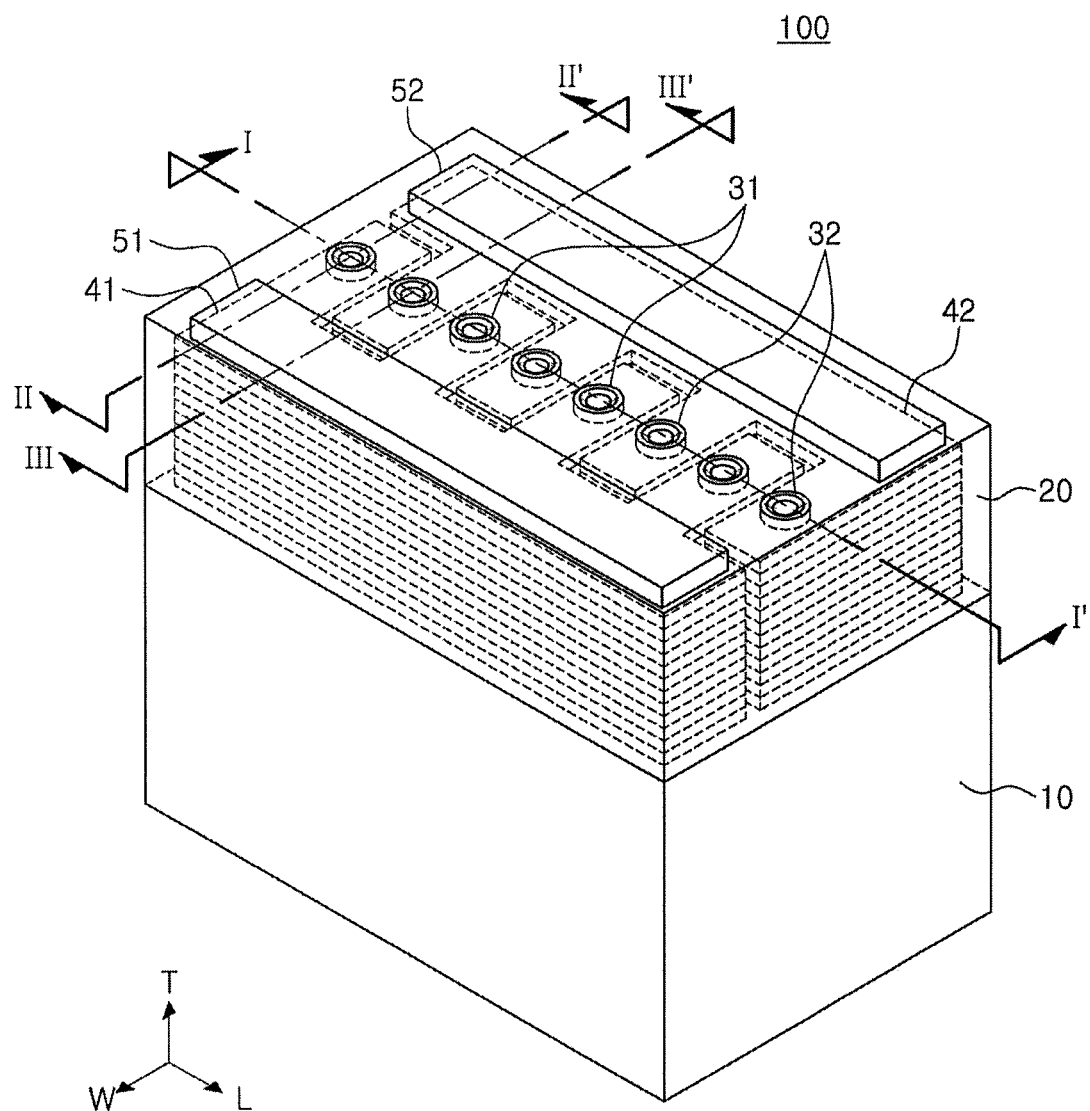
FIG. 1 is a partially cutaway perspective view of a thin-film capacitor according to an exemplary embodiment of the present disclosure.

Hereinafter, exemplary embodiments of the present disclosure will be described with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element, or other elements intervening therebetween may be present. In contrast, when an element is referred to as being "directly on," "directly connected to," or "directly coupled to" another element, there may be no other elements or layers intervening therebetween. Like numerals refer to like elements throughout. As used herein, the term "and/or" includes any and all combinations of one or more of the associated, listed items.

It will be apparent that, although the terms 'first,' 'second,' 'third,' etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" or the like, may be used herein for ease of description to describe one element's relationship relative to another element(s), as shown in the figures. It will be understood that spatially relative terms are intended to encompass different orientations of the device in use or operation, in addition to the orientation depicted in the figures. For example, if the device in the figures is turned over, elements described as "above," or "upper" relative to other elements would then be oriented "below," or "lower" relative to the other elements or features. Thus, the term "above" can encompass both the above and below orientations, depending on a particular directional orientation of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, exemplary embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, and may for example, include a change in shape resulting from manufacturing. The following embodiments may also be constituted alone or as a combination of several or all thereof.

The contents of the present disclosure described below may have a variety of configurations, and only a required configuration is proposed herein, but the present disclosure is not limited thereto.

Hereinafter, a thin-film capacitor according to exemplary embodiments of the present disclosure will be described.

Figure 2:
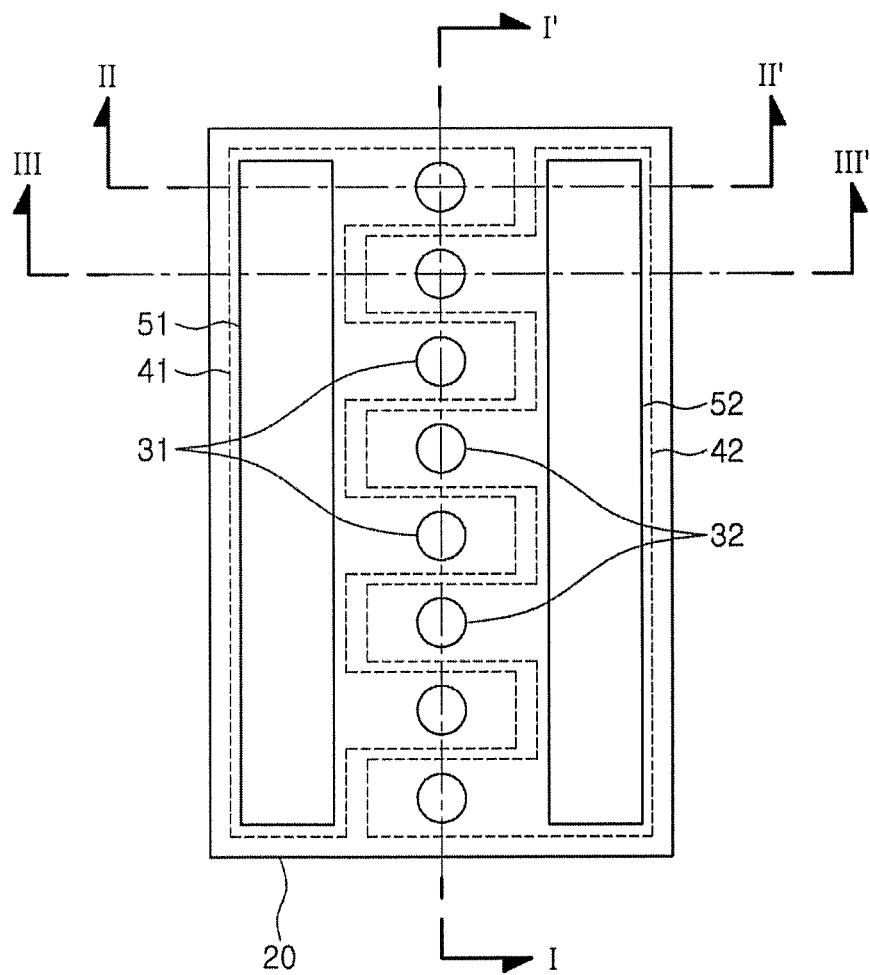
FIG. 2 is a plan view of a thin-film capacitor according to exemplary embodiments of the present disclosure.

FIG. 1 is a partially cutaway perspective view of a thin-film capacitor 100 according to exemplary embodiments. FIG. 2 is a plan view of the thin-film capacitor 100 according to exemplary embodiments.

Figure 3:
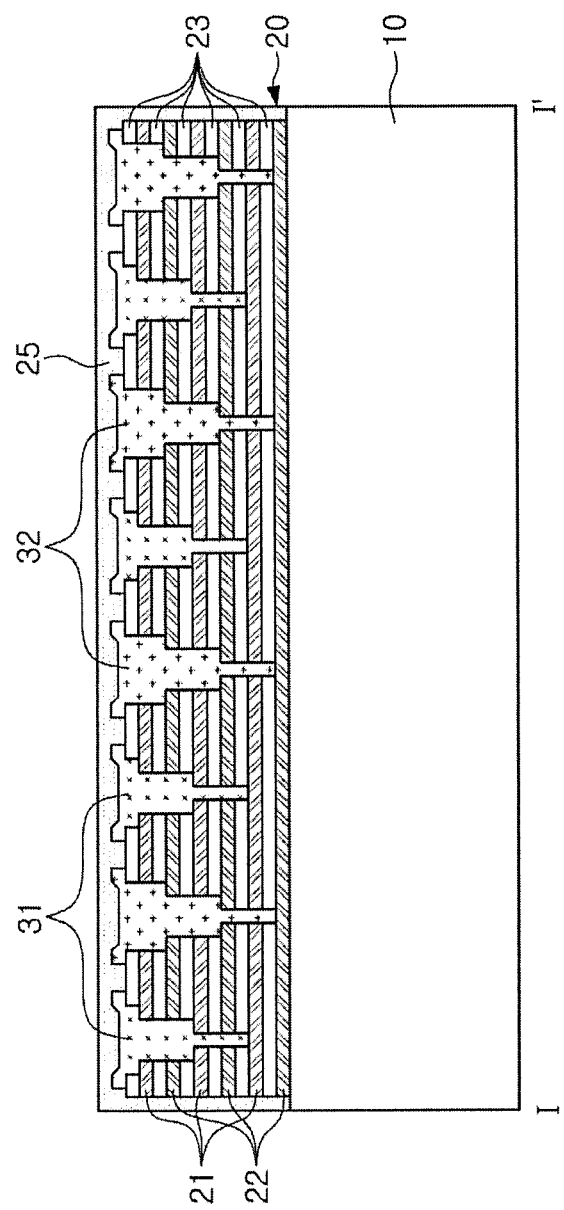
FIG. 3 is a cross-sectional view taken along line I-I' of FIG. 1.

FIG. 3 is a cross-sectional view taken along line I-I' of FIG. 1.

Referring to FIGS. 1 and 3, the thin-film capacitor 100 according to exemplary embodiments may include a body 20 formed by alternately stacking first and second electrode layers 21 and 22 and dielectric layers 23 on a substrate 10. A plurality of vias 31 and 32 may be disposed in the body 20. Among the vias, a first via 31 may be electrically connected to the first electrode layer 21 and a second via 32 may be electrically connected to the second electrode layer 22.

The thin-film capacitor 100 may further include first and second electrode pads 51 and 52 disposed outside the body 20 and in positions in which the first and second electrode pads 51 and 52 do not overlap the first and second vias 31 and 32, with respect to a stacking direction, a first connection electrode 41 disposed outside the body 20 and electrically connecting the first electrode pad 51 to the first via 31, and a second connection electrode 42 disposed outside of the body 20 and electrically connecting the second electrode pad 52 to the second via 32.

Among the vias 31 and 32, the first via 31 may connect the first electrode layer 21 to the first electrode pad 51, and the second via 32 may connect the second electrode layer 22 to the second electrode pad 52.

According to exemplary embodiments, a 'length direction' of the thin-film capacitor may refer to an 'L' direction of FIG. 1, a 'width direction' there may refer to a 'W' direction of FIG. 1, and a 'thickness direction' there may refer to a 'T' direction of FIG. 1. The 'thickness direction' may be the same as a direction in which a dielectric layer and an electrode layer are stacked, that is, a 'stacking direction'.

The body 20 is not particularly limited in shape, and generally may have a hexahedral shape. Further, dimensions of the body 20 are not particularly limited, and may have a size of, for example, 0.6 mm×0.3 mm, and the thin-film capacitor according to exemplary embodiments may be a high-stacked and high-capacity thin-film capacitor of 1.0 µF or more.

The thin-film capacitor 100 may have the substrate 10 having insulating properties in a layer of the substrate 10 in contact with the first and second electrode layers 21 and 22. The substrate 10 may be formed of a material selected from among one or more of $Al_2O_3$, $SiO_2/Si$, MgO, $LaAlO_3$ and $SrTiO_3$, but is not limited thereto. The substrate 10 may have sufficient flatness and surface roughness.

Figure 4A:
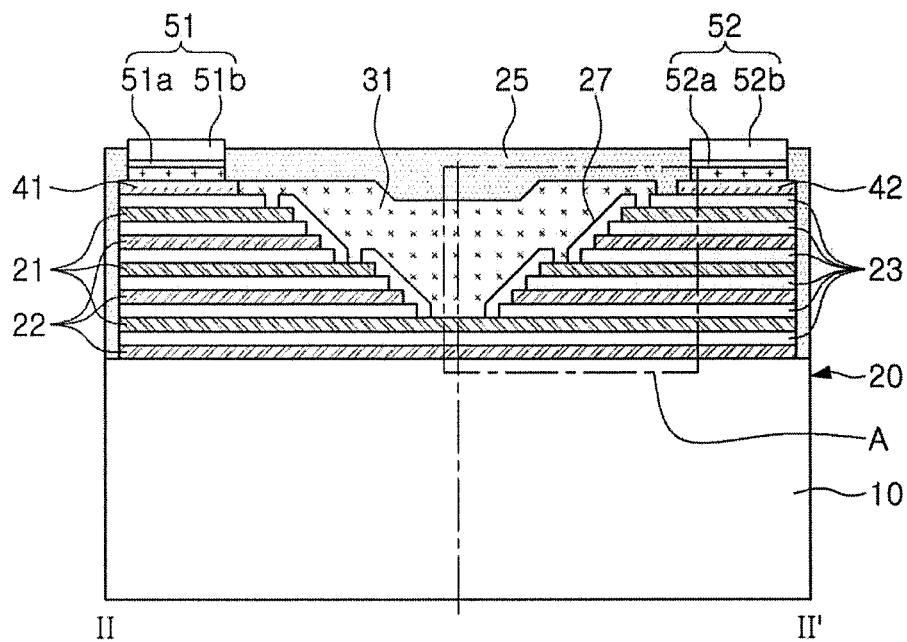
FIG. 4A is a cross-sectional view taken along line II-II' of FIG. 1.
Figure 4B:
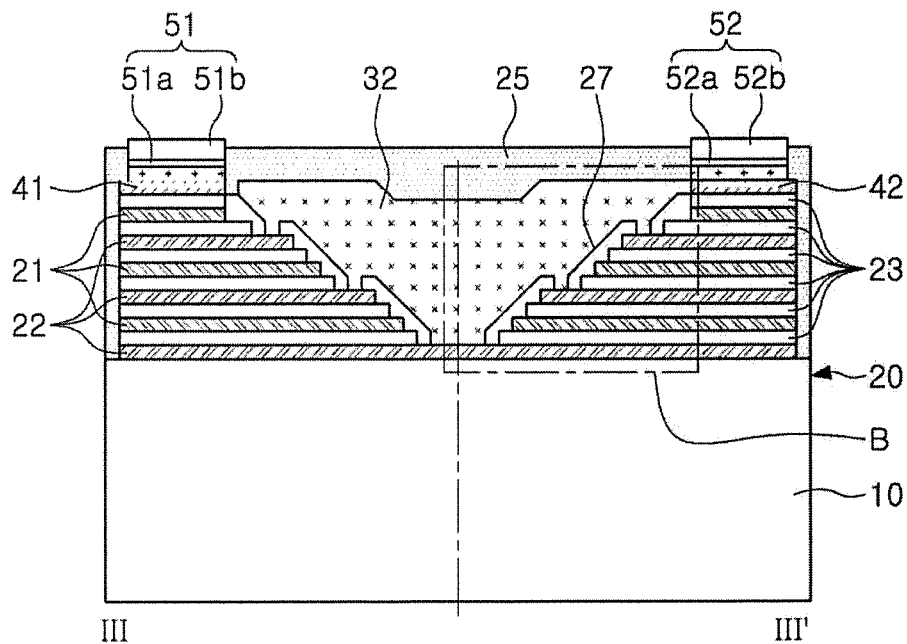
FIG. 4B is a cross-sectional view taken along line III-III' of FIG. 1.

FIG. 4A is a cross-sectional view taken along line II-II' of FIG. 1. FIG. 4B is a cross-sectional view taken along line III-III' of FIG. 1.

Referring to FIGS. 4A and 4B, the body 20 may have a stack structure in which the second electrode layer 22 is formed on the substrate 10, the dielectric layer 23 is formed on the second electrode layer 22 and the first electrode layer 21 is formed on the dielectric layer 23. For example, a plurality of first electrode layers 21 and a plurality of second electrode layers 22 may be alternately stacked with dielectric layers 23 interposed therebetween. However, the stack structure is not limited to the stacking number illustrated in the drawings.

The body 20 may be formed by stacking the dielectric layers 23 and the first and second electrode layers 21 and 22 on the substrate 10 such that the dielectric layers 23 and the first and second electrode layers 21 and 22 are alternately stacked.

More specifically, the body 20 may be formed by stacking the dielectric layers 23 in the thickness direction, while alternately stacking the first and second electrode layers 21 and 22 to face the dielectric layer 23, and may be formed by collectively stacking the first and second electrode layers 21 and 22 in a vacuum.

According to exemplary embodiments, interlayer etching may be performed on different areas in order to selectively connect internal electrodes of the thin-film capacitor, collectively stacked within the vacuum, such that the via may have a multistage shape, that is, a stepped shape.

In addition, an insulating layer may be formed on an internal electrode to be insulated among the internal electrodes exposed through the via, etched to have the stepped shape, and thus an electrical connection may be prevented.

Subsequently, only the electrode to be connected may be exposed, a seed layer may then be formed by an electroless plating or sputtering method, and a conductive metal may be disposed by plating, forming an electrode connection layer.

By the above configuration, an interlayer electrical connection of the internal electrodes may be implemented by a single via.

According to exemplary embodiments, since the thin-film capacitor is fabricated by collectively stacking the dielectric layers 23 and the first and second electrode layers 21 and 22 within the vacuum, damage which may occur due to the thin-film capacitor being exposed to an external environment may be significantly reduced.

As the first and second electrode layers 21 and 22 and the dielectric layers 23 are increasingly stacked as multiple layers, equivalent series resistance (ESR) of the capacitor may be reduced.

The first and second electrode layers 21 and 22 may be formed as a single layer without a predetermined pattern.

The first and second electrode layers 21 and 22 may be formed of a conductive material.

The conductive material may be one or more of copper (Cu), aluminum (Al), gold (Au), silver (Ag), platinum (Pt), iridium (Ir), ruthenium (Ru) or the like, but is not limited thereto.

High-temperature heat history may be entailed during a process of forming the dielectric layer, a high-k thin film, which may cause the electrode layer to be spread to the dielectric layer or react to the dielectric layer to increase a leakage current in the capacitor.

The first and second electrode layers 21 and 22 may be formed of platinum (Pt), a high melting point material, and thus spreading or reaction thereof to the dielectric layer may be reduced or prevented.

The dielectric layer 23 may include a perovskite material having high permittivity.

The perovskite material may be one selected from dielectric materials whose permittivity is significantly changed, for example, one or more of a barium titanate ($BaTiO_3$)-based material, a strontium titanate ($SrTiO_3$)-based material, a (Ba,Sr) $TiO_3$-based material and a PZT-based material, but is not limited thereto.

The first via 31 may be electrically connected to the first electrode layer 21, the second via 32 may be electrically connected to the second electrode layer 22, and the first via 31 and the second via 32 may be electrically insulated from each other.

The first and second vias 31 and 32 may be formed of a conductive material, and may be formed by a plating process. Accordingly, a dimple may be formed on an upper surface of each of the first and second vias 31 and 32.

The conductive material may be one or more of Cu, Al, Au, Ag, Pt or the like, but is not limited thereto.

The first and second vias 31 and 32 may be formed in plural. When the first and second vias 31 and 32 are formed in plural, the contact surface by which the first and second vias 31 and 32 are respectively in contact with the first and second electrode layers 21 and 22 may be increased to lower the ESR of the capacitor.

Referring to FIGS. 1 through 3, 4A and 4B, the first and second connection electrodes 41 and 42 may connect the first and second vias 31 and 32 to the first and second electrode pads 51 and 52, respectively.

The first and second connection electrodes 41 and 42 may be formed of a conductive material, and may be formed by a plating process.

The conductive material may be one or more of Cu, Al, Au, Ag, Pt or the like, but is not limited thereto.

The first and second electrode pads 51 and 52 may be formed on an upper surface of the body 20, and may be electrically connected to the first and second electrode layers 21 and 22 through the vias 31 and 32 exposed to the surface of the body 20, respectively.

The first and second electrode pads 51 and 52 may be formed on an upper surface of the body 20 by a thin film formation process such as sputtering or e-beam deposition.

The first and second electrode pads 51 and 52 may include a conductive material.

The conductive material may be one or more of Cu, Al, Au, Ag, Pt or the like, but is not limited thereto.

The first and second electrode pads 51 and 52 may include seed layers 51a and 52a and electrode layers 51b and 52b grown from the seed layers 51a and 52a, respectively.

The first and second electrode pads 51 and 52 may be disposed in positions on which the first and second electrode pads 51 and 52 do not overlap the first and second vias 31 and 32 with respect to the stacking direction of the dielectric layer and the electrode layers.

The first and second electrode pads 51 and 52 may be integrated with the first and second connection electrodes 41 and 42, or may be disposed on the first and second connection electrodes 41 and 42.

Due to the disposition of the vias 31 and 32, the first and second connection electrodes 41 and 42 may have a comb shape. The comb shape of the first and second connection electrodes 41 and 42 may be a shape in which the first and second connection electrodes engage with each other alternately.

In detail, the first connection electrode 41 may include a plurality of first connection portions respectively connected from the first vias 31, and a first electrode portion connected to the first connection portions. The second connection electrode 42 may include a plurality of second connection portions respectively connected from the second vias 32, and a second electrode portion connected to the second connection portions.

Since the first connection electrode 41 and the second connection electrode 42 also have mutually opposite polarities, a better ESL reduction effect may be obtained when the first connection electrode 41 and the second connection electrode 42 are closer to each other.

The first and second connection portions may be branches extending from the first and second vias 31 and 32.

An insulating layer 27 may be formed to electrically connect the first via 31 and the second via 32 to the first electrode layer 21 and the second electrode layer 22, respectively.

The insulating layer 27 may be formed between the first via 31, and the dielectric layer 23 and the second electrode layer 22, and between the second via 32, and the dielectric layer 23 and the first electrode layer 21.

The insulating layer 27 may secure insulation between the first via 31 and the second electrode layer 22 and insulation between the second via 32 and the first electrode layer 21.

Since the insulating layer 27 is formed on a surface of the dielectric layer 23, parasitic capacitance generated therein may be reduced.

The insulating layer 27 may be formed of an organic material such as benzocyclobutene (BCB), polyimide, or the like, or an inorganic material such as $SiO_2$, $Si_3N_4$, or the like, and may have permittivity lower than that of a material of the dielectric layer 23 in order to obtain high insulating properties and reduce parasitic capacitance.

The insulating layer 27 may be formed through chemical vapor deposition (CVD) allowing a film to have a uniform thickness in a complex three-dimensional shape.

A protective layer 25 may prevent degradation of a material of the body 20 and the first and second connection electrodes 41 and 42 due to a chemical reaction that may be made with humidity and oxygen from the outside, contamination, and damage when the capacitor is mounted.

The protective layer 25 may be formed of a material having high heat resistance, and may be formed of an organic heat-curing material or a photo-curing material such as polyimide, for example.

Referring to FIGS. 4A and 4B, the vias 31 and 32 having the multistage shape may be disposed in the body 20.

The first via 31 of the first and second vias 31 and 32 may connect the first electrode layer 21 to the first electrode pad 51, and may penetrate from the surface of the body 20 to a first lowermost electrode layer 21 adjacent the substrate 10. The second via 32 of the first and second vias 31 and 32 may connect the second electrode layer 22 to the second electrode pad 52, and may penetrate from the surface of the body 20 to a second lowermost electrode layer 22 adjacent the substrate 10.

An upper surface of the first electrode layer 21 may be exposed in the first via 31, and an upper surface of the second electrode layer 22 may be exposed in the second via 32. The first and second electrode layers 21 and 22 may be connected to the first and second electrode pads 51 and 52, respectively.

According to exemplary embodiments, the vias 31 and 32 may have the multistage shape, the stepped shape, and a width of each stage of the vias 31 and 32 may be increased in a direction from the substrate 10 to an upper portion of the body 20.

By forming the first and second vias 31 and 32 so that the width of each stage thereof is increased in the direction from the substrate 10 to the upper portion of the body 20 as described above, the first via 31 may be connected to all of the first electrode layers 21 disposed in the body 20, and the second via 32 may be connected to all of the second electrode layers 22 disposed in the body 20.

Since the width of each stage of the first and second vias 31 and 32 is increased upwardly from the substrate 10 in the body 20, the insulating layer 27 may be disposed on etched or cut surfaces of the first electrode layer 21 exposed within the first via 31 and the second electrode layer 22 exposed within the second via 32, and the upper surfaces of the first electrode layer 21 and the second electrode layer 22 may be exposed.

Since the first via 31 is repeatedly etched multiple times to the layer to which the first electrode layer 21 is exposed and has the multistage shape, the stepped shape, and the width of each stage is increased in the direction from the substrate 10 to the upper portion of the body 110, the insulating layer 27 may be disposed on the etched or cut surfaces of the dielectric layer 23 and the first and second electrode layers 21 and 22, and only the upper surface of the first electrode layer 21 may be exposed, after an insulating process.

Thus, all of the first electrode layers 21 may be electrically connected to the first via 31, and may be electrically connected to the first electrode pad 51 through the first via 31.

Since the second via 32 is repeatedly etched multiple times to the layer to which the second electrode layer 22 is exposed and has the multistage shape, the stepped shape, and the width of each stage is increased in the direction from the substrate 10 to the upper portion of the body 20, the insulating layer 27 may be disposed on the etched or cut surfaces of the dielectric layer 23 and the first and second electrode layers 21 and 22, and only the upper surface of the second electrode layer 22 may be exposed, after an insulating process.

Thus, all of the second electrode layers 22 may be electrically connected to the second via 32, and may be electrically connected to the second electrode pad 52 through the second via 32.

The insulating layer 27 may be disposed on the second electrode layer 22 exposed within the first via 31 and on the first electrode layer 21 exposed within the second via 32.

In detail, the insulating layer 27 may be disposed on the etched or cut surfaces of the second electrode layer 22 exposed within the first via 31 and the first electrode layer 21 exposed within the second via 32.

In exemplary embodiments, since the first via 31 is connected to all of the first electrode layers 21 and the second via 32 is connected to all of the second electrode layers 22, there is no problem in forming capacitance even when one or a plurality of internal electrodes are not connected to the via due to an operational variance.

In other words, in the structure in which one internal electrode is connected to one via as in the related art, if the connection fails, capacitance may not be formed. As a result, capacitance of the capacitor may be reduced.

However, according to exemplary embodiments, since the first via 31 is connected to all of the first electrode layers 21 and the second via 32 is connected to all of the second electrode layers 22, there is no problem in forming capacitance of the capacitor even when a portion of the internal electrodes are not connected to the via. As a result, reliability of the capacitor may be excellent, or improved relative to that of the related art.

The first via 31 may be provided in plural, and a plurality of first vias 31 may have the same depth as each other. The second via 32 may also be provided in plural and a plurality of second vias 32 may also have the same depth as each other.

Figure 5A:
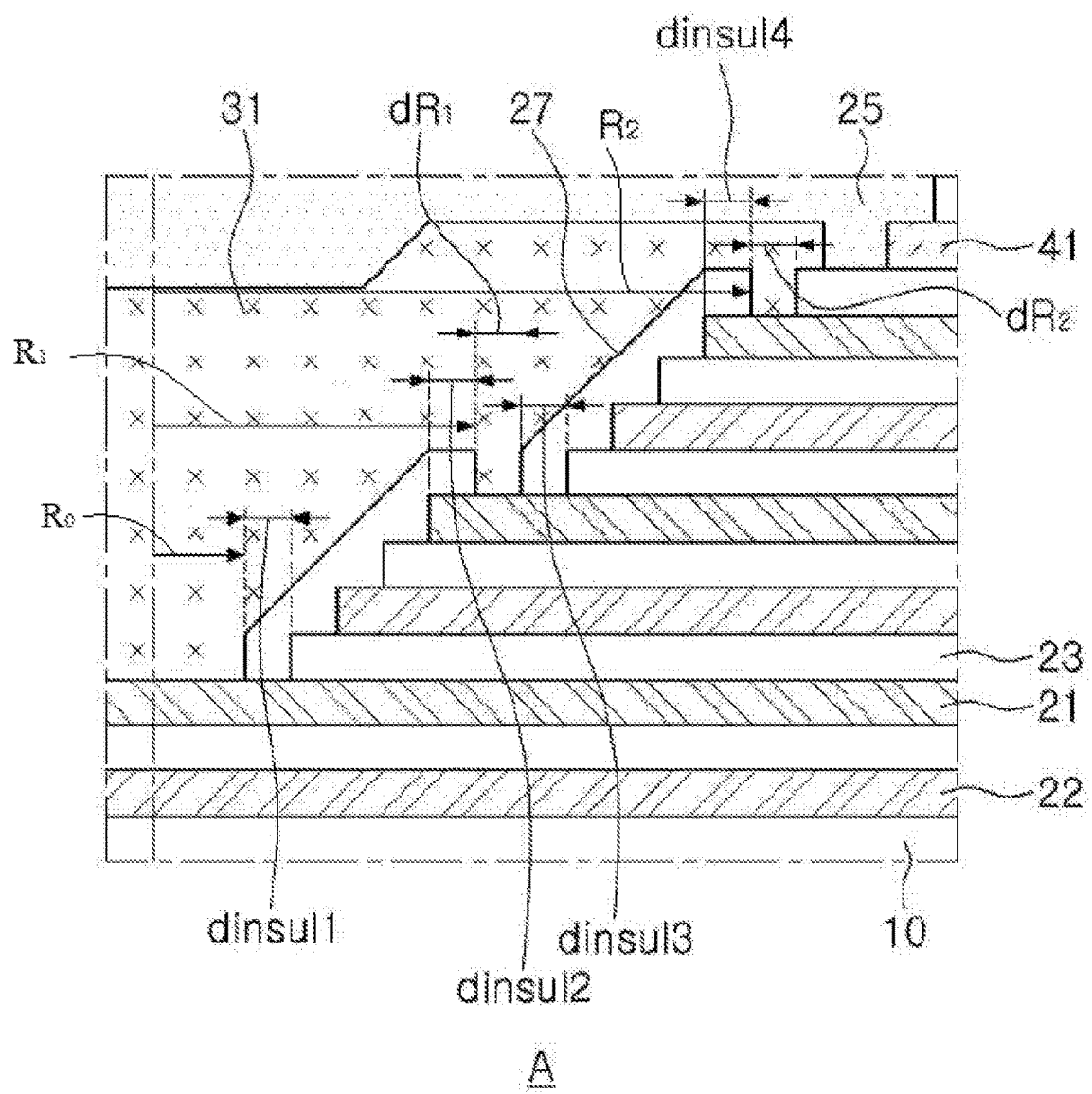
FIG. 5A is an enlarged view of region A of FIG. 4A.
Figure 5B:
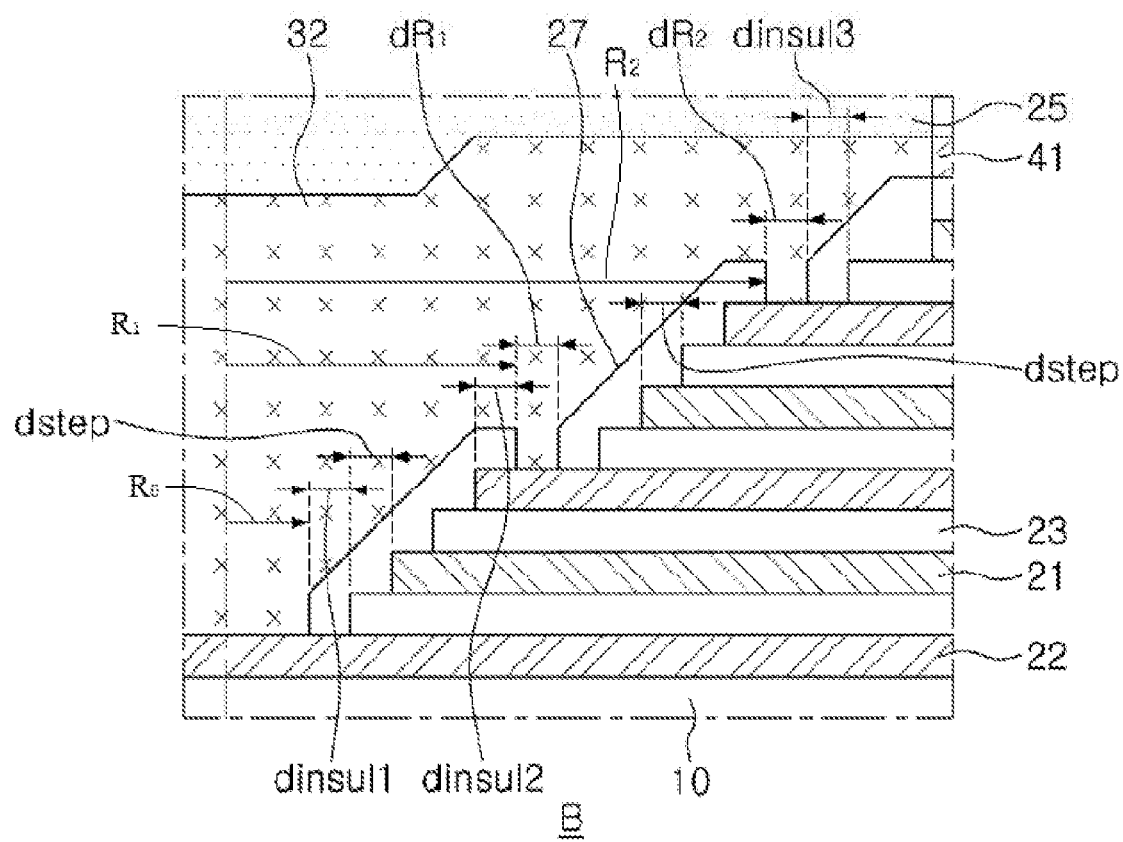
FIG. 5B is an enlarged view of region B of FIG. 4B.

FIG. 5A is an enlarged view of region A of FIG. 4A. FIG. 5B is an enlarged view of region B of FIG. 4B.

Referring to FIGS. 5A and 5B, the thin-film capacitor according to exemplary embodiments may include the first and second vias 31 and 32 disposed in the first and second lowermost electrode layers 21 and 22. When a radius of each of the first and second vias 31 and 32 disposed in the first and second lowermost electrode layers 21 and 22 is $R_0$, in the first and second vias 31 and 32 disposed in the first and second electrode layers 21 and 22 having the same polarities as the first and second lowermost electrode layers 21 and 22 from a portion of the first and second electrode layers 21 and 22, disposed above the first and second lowermost electrode layers 21 and 22, to first and second uppermost electrode layers 21 and 22 adjacent one surface of the body 20, a radius of each of the first and second vias 31 and 32 to an upper surface of the portion of the first and second electrode layers 21 and 22, through which the portion of the first and second electrode layers 21 and 22 having the same polarities is exposed, is $R_i$ ($i \geq 1$), a radius of the exposed upper surface of the portion of the first and second electrode layers 21 and 22 having the same polarities as the first and second lowermost electrode layers 21 and 22 from the portion of the first and second electrode layers 21 and 22, disposed above the first and second lowermost electrode layers 21 and 22, to the first and second uppermost electrode layers 21 and 22 adjacent the surface of the body 20, is $dR_i$ ($i \geq 1$), and an exposed area of each of the first and second lowermost electrode layers 21 and 22 is $\pi R_0^2$, an area of the exposed upper surface of the portion of the first and second electrode layers 21 and 22, disposed above the first and second lowermost electrode layers 21 and 22 and having the same polarities as the first and second lowermost electrode layers 21 and 22, is defined as $2\pi(R_i+dR_i/2)dR_i$, the area of the exposed upper surface falling within $\pi R_0^2 < 2\pi(R_i+dR_i/2)dR_i < 2\pi(R_{i+1}+dR_{i+1}/2)dR_{i+1}$ ($i \geq 1$) and being increased upwardly from each of the first and second lowermost electrode layers 21 and 22.

The exposed upper surface of the portion of the first and second electrode layers 21 and 22 having the same polarities as the first and second lowermost electrode layers 21 and 22 may be defined as an electrical connection portion of the portion of the first and second electrode layers 21 and 22 connected to the first and second electrode pads 51 and 52, respectively, through the first and second vias 31 and 32.

In other words, the upper surface of the first electrode layer 21 may be exposed within the first via 31 to be provided as the electrical connection portion connected to the first electrode pad 51, and the upper surface of the second electrode layer 22 may be exposed within the second via 32 to be provided as the electrical connection portion connected to the second electrode pad 52.

The area of the exposed upper surface of the portion of the first and second electrode layers 21 and 22 having the same polarities may fall within $\pi R_0^2 < 2\pi(R_i+dR_i/2)dR_i < 2\pi(R_{i+1}+dR_{i+1}/2)dR_{i+1}$ ($i \geq 1$), and may be adjusted to be increased upwardly from the first and second lowermost electrode layers 21 and 22. Thus, low equivalent series inductance (ESL) may be obtained in a high-frequency domain.

In other words, an area of the electrical connection portion of the electrode layers connected to the via may be increased toward the uppermost electrode layer from the lowermost electrode layer adjacent the substrate, thus obtaining low ESL in the high-frequency domain.

Generally, a skin effect may cause a flow of electric charges to concentrate on a portion of the dielectric layer adjacent the substrate in the high-frequency domain.

In exemplary embodiments, the area of the electrical connection portion of the electrode layers connected to the via may be increased toward the uppermost electrode layer from the lowermost electrode layer adjacent the substrate, thus obtaining low ESL in the high-frequency domain.

In particular, a radius of an exposed upper surface of each of the first and second uppermost electrode layers 21 and 22, adjacent the surface of the body 20, of the radius $R_i+dR_i$ ($i \geq 1$) of the exposed upper surface of the portion of the first and second electrode layers having the same polarities as the first and second lowermost electrode layers, may be greater than a radius of an exposed upper surface of another portion of the first and second electrode layers 21 and 22 having the same polarities.

In other words, a radius of the exposed upper surface of the first uppermost electrode layer 21 adjacent the surface of the body 20 may be greater than a radius of the exposed upper surface of another first electrode layer 21 disposed below the first uppermost electrode layer 21, and a radius of the exposed upper surface of the second uppermost electrode layer 22 adjacent the surface of the body 20 may be greater than a radius of the exposed upper surface of another second electrode layer 22 disposed below the second uppermost electrode layer 22.

Thus, the radius dR of the exposed upper surface of each of the first and second uppermost electrode layers 21 and 22 adjacent the surface of the body may be significantly increased, thus obtaining low ESL in the high-frequency domain.

FIG. 5A illustrates the first via 31 connected to all of the first electrode layers 21, and the first via 31 may be referred to as an upper via. FIG. 5B illustrates the second via 32 connected to all of the second electrode layers 22, and the second via 32 may be referred to as a lower via.

According to exemplary embodiments, the first or second lowermost electrode layer disposed on the substrate 10 may be the second electrode layer 22. A difference between a radius of an uppermost circular pattern exposed to the surface of the body 20 in the second via 32 and a radius of an uppermost circular pattern exposed to the surface of the body 20 in the first via 31 may be greater than 0 and less than or equal to 7 μm. The radius of the uppermost circular pattern exposed to the surface of the body 20 in the second via 32 may be greater than the radius of the uppermost circular pattern exposed to the surface of the body 20 in the first via 31.

Thus, low ESL may be obtained in the high-frequency domain.

The radius $R_0$ of each of the first and second vias 31 and 32 disposed in the first and second lowermost electrode layers 21 and 22 may fall within 5 μm<$R_0$<30 μm.

Further, the first and second electrode layers 21 and 22 may have the stepped shape to the surface of the body 20 on the substrate 10, and when a radius of an exposed area between the first and second electrode layers 21 and 22 is $d_{step}$, $d_{step}$ may fall within 0<$d_{step}$<4 μm.

When a width of the insulating layer 27 is $d_{insul}$, $d_{insul}$ may fall within 0<$d_{insul}$<3 μm, and a thickness of the insulating layer 27 may be greater than 0.3 μm and less than 1.5 μm.

Hereinafter, an example of manufacturing a thin-film capacitor according to exemplary embodiments will be described, but the present disclosure is not limited to the exemplary embodiments.

FIGS. 6A through 6J are views illustrating a process of forming a via within a thin-film capacitor according to exemplary embodiments of the present disclosure.

Hereinafter, a process of forming a via within a thin-film capacitor will be described with reference to FIGS. 6A through 6J.

Figure 6A:
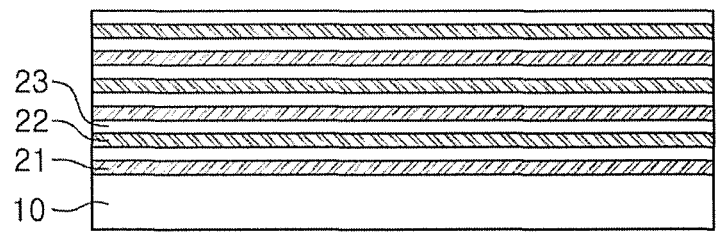
FIGS. 6A through 6J are views illustrating a process of forming a via within a thin-film capacitor according to exemplary embodiments of the present disclosure.

Referring to FIG. 6A, a stacked body may be provided by stacking dielectric layers 23 and first and second electrode layers 21 and 22 on a substrate 10 such that the dielectric layers 23 and the first and second electrode layers 21 and 22 are alternately stacked.

The substrate 10 may include, but is not particularly limited to, for example, a prepreg.

A perovskite-based dielectric material such as barium titanate ($BaTiO_3$), or the like, may be deposited on the substrate 10 to form the dielectric layer 23, and a conductive metal may be deposited thereon, using a thin film formation process, such as sputtering, e-beam deposition, or the like, to form the first electrode layer 21, and the dielectric layer 23 and the second electrode layer 22 may be formed thereon.

Accordingly, the first and second electrode layers 21 and 22 may be alternately stacked on opposing surfaces of the dielectric layer 23.

The dielectric layer 23 and the first and second electrode layers 21 and 22 may be stacked through deposition, but the method used is not limited thereto, and may be a method such as chemical solution deposition (CSD).

The dielectric layer 23 and the first and second electrode layers 21 and 22 may be collectively stacked without separate patterning in a vacuum state.

Figure 6B:
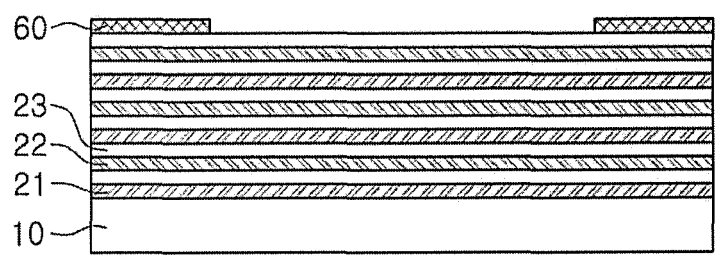

Referring to FIG. 6B, a photoresist 60 may be applied to an upper surface of the stacked body and may pattern the photoresist 60 through exposure and development, in order to expose interlayer electrodes disposed in the stacked body.

Figure 6C:
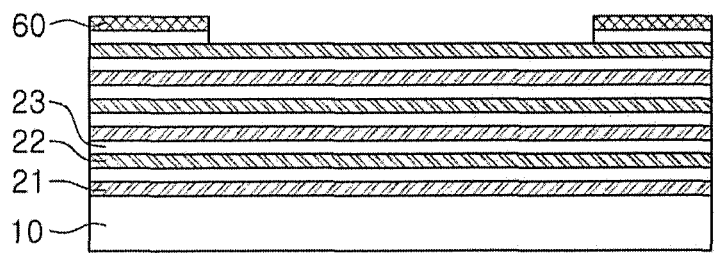

Referring to FIG. 6C, etching may be performed up to a predetermined electrode layer to form a via.

The via illustrated in FIG. 6C may be a first via formed by etching up to the first electrode layer adjacent the upper surface of the stacked body such that the first electrode layer closest to the upper surface of the stacked body is exposed.

Such a process of forming a via by etching may be performed by further repeating one operation.

Figure 6D:
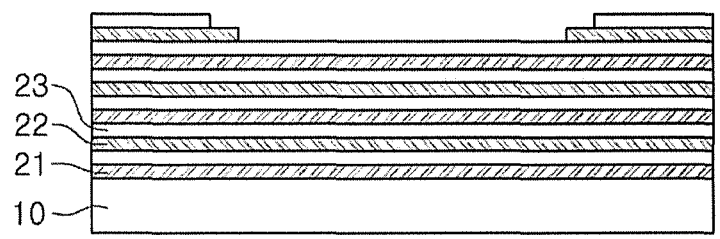

Referring to FIG. 6D, the patterned photoresist 60 may then be removed.

Figure 6E:
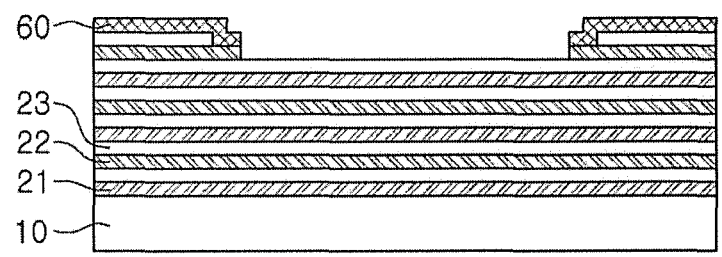

Referring to FIG. 6E, the photoresist 60 may be applied from the upper surface of the stacked body to a lower surface of the via, i.e., to an upper surface of the exposed first electrode layer, and may be patterned through exposure and development.

The patterned photoresist 60 may be patterned to have an area narrower than the photoresist 60 patterned in FIG. 6B.

Figure 6F:
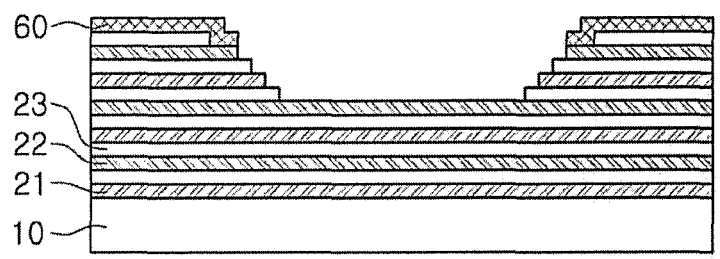

Referring to FIG. 6F, etching may be performed up to a subsequent predetermined electrode layer to form a via.

The via illustrated in FIG. 6F may be a first via formed by etching up to the first electrode layer closest to the upper surface of the stacked body in a direction of the substrate such that a first electrode layer next to the first electrode layer closest to the upper surface of the stacked body is exposed, so as to be connected to the first electrode layer.

During the etching process, the dielectric layer and the second electrode layer disposed between the first electrode layer closest to the upper surface and the subsequent first electrode layer may be simultaneously exposed.

In other words, the layers penetrated per, or by, the etching process conducted once may include two or more electrodes and dielectric layers.

The via may have a width less than that of the via formed by etching such that the first electrode layer closest to the upper surface of the stacked body is exposed.

According to exemplary embodiments, a plurality of vias may be formed by repeating the above processes, and each of the vias may have a width less than that of an upper via adjacent thereto.

In other words, the etching process may be performed such that the first and second electrode layers are exposed to have the stepped shape.

Figure 6G:
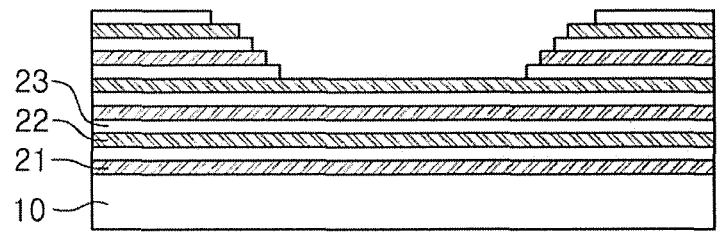

In detail, referring to FIG. 6G, the patterned photoresist 60 may then be removed.

Figure 6H:
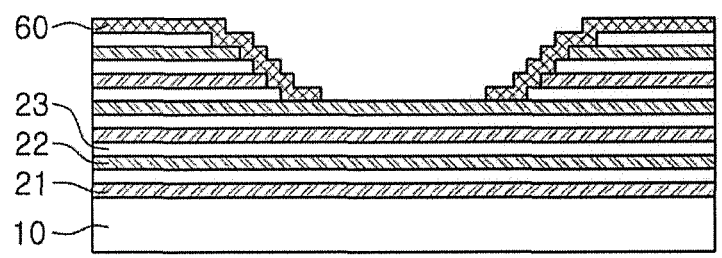

Referring to FIG. 6H, the photoresist 60 may be applied from the upper surface of the stacked body to the lower surface of the via formed in FIG. 6F, i.e., to the upper surface of the exposed first electrode layer, and may be patterned through exposure and development.

The patterned photoresist 60 may be patterned to have an area narrower than that of the photoresist 60 patterned in FIG. 6E.

Figure 6I:
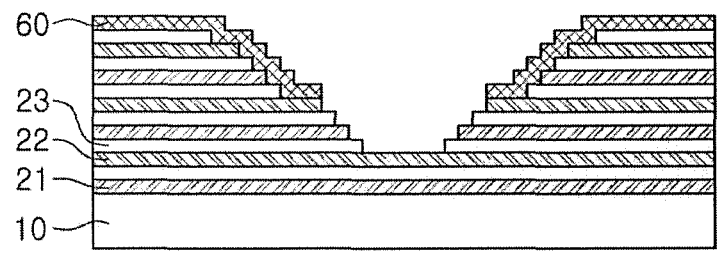

Referring to FIG. 6I, etching may be performed up to a subsequent predetermined electrode layer to form a via.

As illustrated in FIG. 6I, etching may be performed such that the first electrode layer disposed below the first electrode layer exposed in FIG. 6F is exposed to form a via.

During the etching process, the dielectric layer and the second electrode layer disposed between the first electrode layer exposed in FIG. 6F and the first electrode layer disposed therebelow may be simultaneously exposed.

The via may have a width less than that of the via formed in FIG. 6F.

Figure 6J:
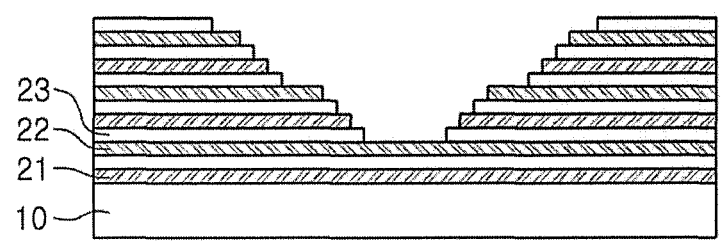

Referring to FIG. 6J, the patterned photoresist 60 may then be removed.

FIGS. 7A through 7D are views illustrating a process of forming an insulating layer in a via within a thin-film capacitor according to exemplary embodiments of the present disclosure.

FIGS. 7A through 7D illustrate a process of patterning an insulating layer to selectively connect exposed electrodes.

In other words, the first via may be connected to the first electrode layer, and the simultaneously exposed second electrode layer should be insulated. The second via may be connected to the second electrode layer, and the simultaneously exposed first electrode layer should be insulated.

Thus, in the case of the first via, the second electrode layer should be blocked from an electrical connection by a dielectric or insulating layer, and in the case of the second via, the first electrode layer should be blocked from an electrical connection by a dielectric or insulating layer.

FIG. 7A illustrates a cross section of the stacked body in which the first via and the second via are formed by the processes of FIGS. 6A through 6J.

The first via may penetrate from one surface of the stacked body to a first lowermost electrode layer adjacent the substrate 10, and the second via may penetrate from the surface of the stacked body to a second lowermost electrode layer adjacent the substrate 10.

According to exemplary embodiments, the first and second vias may have the multistage shape, the stepped shape, and a width of each stage thereof may be increased in a direction from the substrate 10 to an upper portion of the stacked body.

As described above, since the width of each stage of the first and second vias is increased upwardly from the substrate 10 in the stacked body, the first via may be connected to all of the first electrode layers, and the second via may be connected to all of the second electrode layers.

Figure 7B:
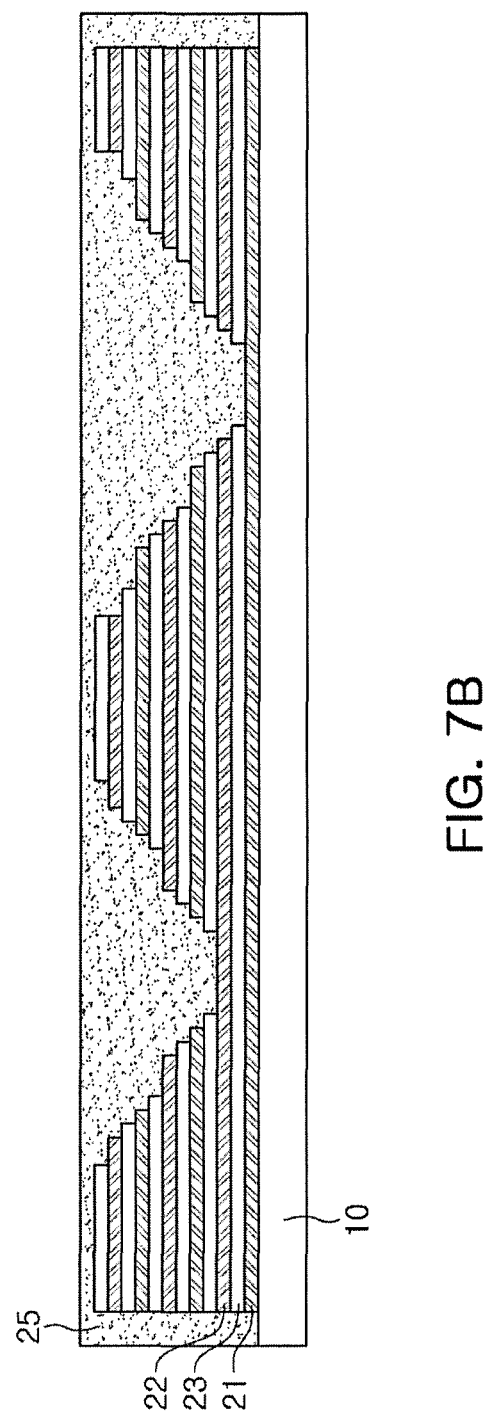

Referring to FIG. 7B, after the vias having the multistage shape are formed within the stacked body, an upper portion of the substrate 10 and an entirety of the stacked body may be coated with an insulating material.

Figure 7C:
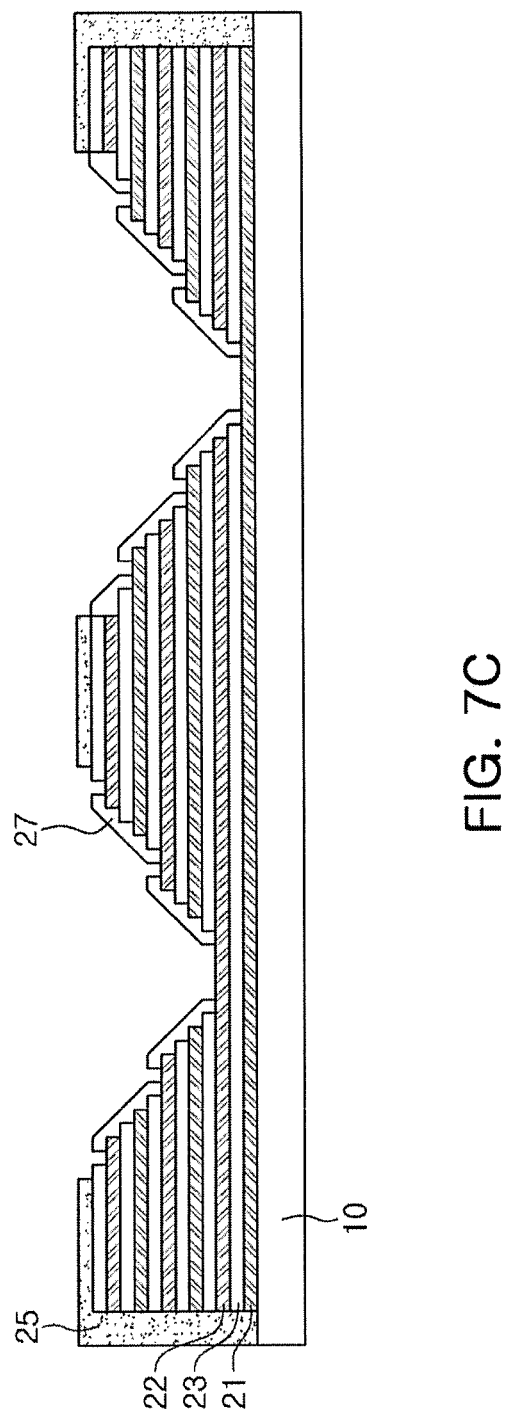

Referring to FIG. 7C, the insulating material may be etched to form an insulating layer 27 and a protective layer 25 within the vias 31 and 32.

The insulating layer 27 may be formed on etched or cut surfaces of the dielectric layer 23 and the first and second electrode layers 21 and 22 in the vias 31 and 32.

Since the width of each stage of the first and second vias 31 and 32 is increased in the direction from the substrate 10 to the upper portion of the stacked body, the first electrode layer 21 exposed in the first via 31 and the second electrode layer 22 exposed in the second via 32 may have the insulating layer 27 disposed on the etched or cut surfaces thereof, and upper surfaces of the first and second electrode layers 21 and 22 may be exposed.

Further, the first via 31 may be formed by performing etching multiple times up to the layer from which the first electrode layer 21 is exposed, and may have the multistage shape, the stepped shape. Since the width of each stage thereof is increased upwardly from the substrate 10 in the stacked body, the insulating layer may be disposed on the etched or cut surfaces of the dielectric layer 23 and the first and second electrode layers 21 and 22, and only the upper surface of the first electrode layer 21 may be exposed after the insulating process.

The second via 32 may be formed by performing etching multiple times up to the layer from which the second electrode layer 22 is exposed, and may have the multistage shape, the stepped shape. Since the width of each stage thereof is increased upwardly from the substrate 10 in the stacked body, the insulating layer may be disposed on the etched or cut surfaces of the dielectric layer 23 and the first and second electrode layers 21 and 22, and only the upper surface of the second electrode layer 22 may be exposed after the insulating process.

According to exemplary embodiments, any one of the first vias 31 may be connected to all of the first electrode layers 21 disposed within the stacked body, and any one of the second vias 32 may be connected to all of the second electrode layers 22 disposed within the stacked body.

The first via 31 may be provided in plural, and a portion of the first vias 31, having the same shape, may have the same depth. The second via 32 may be provided in plural, and a portion of the second vias 32, having the same shape, may have the same depth.

Figure 7D:
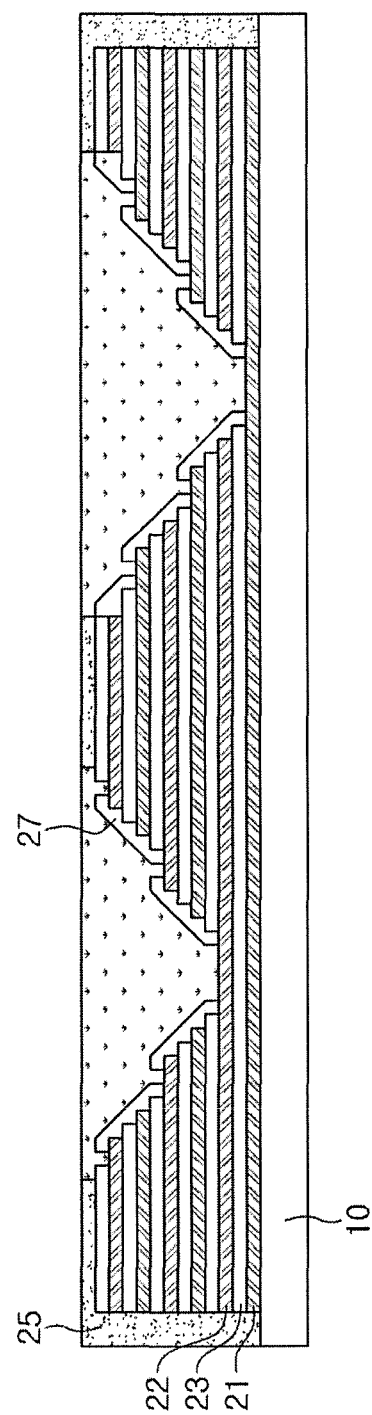

Referring to FIG. 7D, the first and second vias 31 and 32 may be filled with a conductive metal.

During the process of filling the first and second vias 31 and 32 with the conductive metal, a seed layer may be formed on a surface of each of the exposed electrode layers, and the conductive metal may be filled by a plating process to connect the electrode layer and an external electrode.

As set forth above, according to exemplary embodiments, since the dielectric and the electrode may be collectively stacked and then electrically connected to each other by the via having the multistage shape, damage caused by an external environment when depositing the thin film may be significantly reduced, and a compact product having a thinner thickness may be implemented.

Further, since all of the respective layers requiring an electrical connection may be connected through one via, a decrease in an area caused by the via may be significantly reduced, thus increasing capacitance.

In addition, since a product structure may be simplified by patterning the insulating layer within the via, the number of stacked thin-film capacitors may be increased, thus achieving high capacitance.

Moreover, the thin-film capacitor according to embodiments may have low equivalent series inductance (ESL) and low equivalent series resistance (ESR).

Furthermore, an area of the connection portion of the electrode layers connected to the via may be increased toward the uppermost electrode layer from the lowermost electrode layer adjacent the substrate, thus achieving low ESL in a high-frequency domain.

In addition, the radius of the exposed upper surface of the uppermost electrode layer adjacent one surface of the body may be significantly increased, thus achieving low ESL in the high-frequency domain.

While exemplary embodiments have been shown and described above, it will be apparent to those skilled in the art that modifications and variations could be made without departing from the scope of the present disclosure, as defined by the appended claims.

What is claimed is:

1. A thin-film capacitor, comprising:
    a body having a plurality of dielectric layers and first electrode layers and second electrode layers alternately stacked on a substrate;
    first and second electrode pads disposed on one surface of the body;
    first vias having a same first depth and having a first multistage shape disposed in the body; and
    second vias having a same second depth different from the first depth and having a second multistage shape disposed in the body,
    wherein each of the first vias connects all of the first electrode layers to the first electrode pad, and penetrates from the one surface of the body to a first lowermost electrode layer among the first electrode layers adjacent the substrate,
    each of the second vias connects all of the second electrode layers to the second electrode pad, and penetrates from the one surface of the body to a second lowermost electrode layer among the second electrode layers adjacent the substrate,
    portions of an upper surface of each of the first electrode layers are exposed in each of the first vias, and portions of an upper surface of each of the second electrode layers are exposed in each of the second vias,
    insulating layers respectively, cover portions of the second electrode layers exposed in each of the first vias and cover portions of the first electrode layers exposed in each of the second vias, and
    in each of the first vias or in each of the second vias, a radius of each of the first and second vias disposed in the first and second lowermost electrode layers is $R_0$, in the first and second vias disposed in the first and second electrode layers having same polarities as the first and second lowermost electrode layers from a portion of the first and second electrode layers, disposed above the first and second lowermost electrode layers, to first and second uppermost electrode layers adjacent the one surface of the body, a radius of each of the first and second vias to an upper surface of the portion of the first and second electrode layers, through which the portion of the first and second electrode layers having the same polarities is exposed, is $R_i$ (i>1), a radius of the exposed upper surface of the portion of the first and second electrode layers having the same polarities as the first and second lowermost electrode layers from the portion of the first and second electrode layers, disposed above the first and second lowermost electrode layers, to the first and second uppermost electrode layers adjacent the one surface of the body, is $dR_i$ ($i>1$), an exposed area of each of the first and second lowermost electrode layers is $\pi R_0^2$, an area of the exposed upper surface of the portion of the first and second electrode layers, disposed above the first and second lowermost electrode layers and having the same polarities as the first and second lowermost electrode layers, is defined as $2\pi(R_i+dR_i/2)dR_i$, and the area of the exposed upper surface fall within $\pi R_0^2 < 2\pi(R_i+dR_i/2)dR_i < 2\pi(R_{i+1}+dR_{i+1}/2)dR_{i+1}$ ($i \geq 1$) and are increased upwardly from each of the first and second lowermost electrode layers.

2. The thin-film capacitor of claim 1, wherein a radius of an exposed upper surface of each of the first and second uppermost electrode layers, adjacent the one surface of the body, of the radius $R_i+dR_i$ ($i \geq 1$) of the exposed upper surface of the portion of the first and second electrode layers having the same polarities as the first and second lowermost electrode layers, is greater than a radius of an exposed upper surface of another portion of the first and second electrode layers having the same polarities.

3. The thin-film capacitor of claim 1, wherein difference between a radius of an uppermost circular pattern exposed to the one surface of the body in each of the second vias and a radius of an uppermost circular pattern exposed to the surface of the body in each of the first vias is greater than 0 and less than or equal to 7 μm.

4. The thin-film capacitor of claim 1, wherein the radius $R_0$ of each of the first and second vias disposed in the first and second lowermost electrode layers falls within 5 μm<$R_0$<30 μm.

5. The thin-film capacitor of claim 1, wherein the first and second electrode layers have a stepped shape to the one surface of the body on the substrate, and a distance of the exposed upper surface of each of the first and second electrode layers and an exposed surface of each of the dielectric layers is $d_{step}$, and $d_{step}$ falls within 0<$d_{step}$<4 μm, and the insulating layers also cover portions of the dielectric layers.

6. The thin-film capacitor of claim 1 wherein a width of each of the insulating layers disposed on the exposed upper surfaces of the first and second electrode layers is $d_{insul}$, and $d_{insul}$ falls within 0<$d_{insul}$<3 μm.

7. The thin-film capacitor of claim 5, wherein a thickness of each of the insulating layers is between 0.3 μm and 1.5 μm, inclusive.

8. The thin-film capacitor of claim 1, wherein a width of each stage of the first and second vias is increased in a direction from the substrate to an upper portion of the body.

* * * * *